Patented Oct. 8, 1935

2,016,274

UNITED STATES PATENT OFFICE 2,016,274

METHOD OF RESTRAINING CRYSTALLIZATION OF DISSOLVED INORGANIC COMPOUNDS IN CONCENTRATED SOLUTIONS

Willis A. Boughton, Cambridge, Mass., assignor to New England Mica Co., Waltham, Mass., a corporation of Massachusetts No Drawing. Application June 22, 1931,
Serial No. 546,154

25 Claims. (Cl. 23—1)

This invention relates to the restraining of the tendency to crystallization of certain inorganic substances from aqueous solution or association on concentration, and to the methods whereby such restraint may be brought about, and thereby increase the field of usefulness of such inorganic substances. The invention further aims to provide a class of products, each consisting of a viscous aqueous association of inorganic compounds which are substantially free from crystal development through a wide range of temperature and through a wide range of concentration; these products have been found to be useful as plastics, binders, insulators, and for many other purposes, and are especially useful for cementing mica flakes in the manufacture of built-up mica products.

An object of the invention is to increase the temperature range of usefulness of these certain aqueous associations of inorganic materials, as plastics, thermoplastics, lubricants, adhesives, etc.

A further object is to prepare solutions or aqueous associations of certain inorganic substances that while so concentrated as to be in the condition of stiff viscous masses, for example like hard asphalt, are still uncrystallized and while in such condition have a commercially useful dielectric strength in thin layers when associated with laminated resistance materials.

Further objects of the invention are to provide new plastic inorganic compositions which are resistant to all organic solvents, that are thermoplastic that do not crystallize through a wide temperature range even when very highly concentrated, and that are excellent high electrical resistant binders for mica flakes in built-up mica products, and that may be molded, or formed into a variety of shapes.

Other objects of the invention will be apparent to those skilled in the art upon reading the specification.

The inorganic substances concerned in this invention are those very few solids which in aqueous solution or association show the anomalous property of noticeable, to high viscosity. Typical of this highly limited group of substances are sodium metaphosphate, sodium monoborate, sodium silicate, metaphosphoric acid, the other alkali metal metaphosphates and monoborates, and a variety of compounds of the element beryllium. Other examples of this type of inorganic substances will be known to those who are familiar with the chemistry of such compounds and the rheology of inorganic solutions.

The aqueous associations of such materials as above referred to are perhaps more in the nature of colloids than true solutions. The viscosities of such aqueous associations are noticeably greater than those of the remainder of soluble inorganic substances, and may range without break or precipitation from the fluid to the solid state. When heated, such associations yield their water slowly as the temperature rises, and retain a portion of it even at temperatures far above that at which the usual precipitation and dehydration take place with ordinary inorganic salts, and retain also the property of viscous fluidity.

Various applications of these materials and their properties have been made (see my patents on inorganic thermoplastics, Patent No. 1,975,077, dated October 2, 1934; inorganic lubricants, Patent No. 1,917,089, dated July 4, 1933; and improvement in the art of bonding, Patent No. 1,975,079, dated October 2, 1934; and colloidal inorganic bonding composition, Patent No. 2,004,030, dated June 4, 1935. But their usefulness could be considerably expanded if the occasional exhibition of crystallization with consequent loss of the desired property of viscous fluidity of the aqueous association of the inorganic substance could be permanently restrained.

After extensive experimentation I have found that this occasional tendency to crystallize in the course of time, or upon further concentration may be restrained and the temperature range of useful viscosity of the aqueous association of the inorganic substances increased by treatment with certain kinds of other inorganic materials, and, as described elsewhere, (art of bonding, Patent No. 1,975,079), I have made practical application of my discoveries to the arts.

This method of treatment of the aqueous associations of the inorganic substances to restrain crystallization consists essentially in adding a minor percentage of one or more inorganic substances which are within one or more of the following general classifications:—

Requirement 1.—An alkali metal salt to be added must be neutral, or must react acidic, or basic, according to whether the viscous aqueous solution in which crystallization is to be restrained is acidic or basic; thus an acidic solution must not be rendered alkaline, nor an alkaline solution acidic.

Requirement 2.—Such a salt when heated must not decompose with resulting change in its respective acidity, alkalinity or neutrality; thus an alkaline salt which on heating yields acidic products must not be added to an alkaline solution.

Requirement 3.—Such a salt must not alter phase rule relations in such a way as to favor formation of a chemical compound not in the group of those forming viscous solutions.

Requirement 4.—Such a salt must have the acid radical identical with that of the compound in viscous aqueous association; thus with sodium metaphosphate the metaphosphates of ammonium, lithium and potassium may be mixed.

*Requirement 5.*—In the case of beryllium salts, the addition must be a salt that does not give an insoluble beryllium compound and is preferably basic in nature.

I am aware that the categorical classification given above is contrary to the commonly accepted rule of chemistry that a salt in concentrated solution becomes less soluble and may be precipitated by addition of a salt with a common ion, and that, except in the case of formation of a soluble complex ion, a salt is ordinarily considered to be less soluble in a solution than in pure water. Nevertheless, abundant experimentation has shown that substances falling within the requirements of the five classes given above when added to the cited viscous inorganic aqueous associations do indeed almost without exception act to restrain their crystallization upon concentration.

Another statement or definition of the phenomenon that the addition of certain substances identified herein to the viscous aqueous colloidal inorganic associations have the effect of retarding crystallization, is:

A substance which when added to a viscous aqueous colloidal inorganic association, of the type described herein, will in the proportions used permit the then final proportions of ions, molecules and micelles at a given temperature to enter new regions of conditions in which crystal formation (otherwise occurring) does not take place through an increased temperature range.

The explanation for this anomalous behavior undoubtedly lies in the fact that the viscous solutions so treated are themselves of an anomalous nature in inorganic chemistry, since in so many physical properties they appear to resemble glues, resins, gums and oils, which latter are organic; and therefore the rules of solubility and precipitation that affect the great majority of inorganic substances, do not necessarily apply to this limited group.

Furthermore, it is possible that to some extent, the known property of organic substances in which the more complex (for example, the more viscous) the association in which they exist, the more difficult it is to obtain them in crystalline form, may apply to these inorganic associations that physically so resemble common organic mixtures. Further, it is known that organic mixtures containing several or more analogous substances such as paraffins, oleates, for example, show extraordinary reluctance to form crystals, and this property may be paralleled in the case of dissolved mixtures of alkali metal salts of the metaphosphates and monoborates, for example, which dissolved mixtures I have found to show less tendency to crystallize than do solutions of the individual salts alone.

Whatever the explanation, however, the fact remains that, in general the addition of certain inorganic substances as classified above in the five requirements, to these viscous aqueous associations of inorganic substances tend to restrain crystallization and broaden the temperature range over which the useful property of viscosity persists.

Typical examples are as follows—

Alkali metal metaphosphates, for example

*Sodium metaphosphate*

This substance exists in several forms differing in the degree of polymerization. The form I prefer to use is that known as Graham's salt, a simple glass, reputed to be the hexapolymer, of the formula $(NaPO_3)_6$, prepared most easily by fusion at red heat of the decomposition product of monosodium orthophosphate, or of microcosmic salt (sodium ammonium phosphate). It has also recently become an article of commerce.

Solutions of this substance in useful viscosities may be prepared by mixing the powdered glass with the correct amount of water. The powder rapidly takes up the water and the mixture becomes viscous, transparent and adhesive to an extent depending on its concentration. Solutions may also be prepared by agitation of the unpowdered glass with suitable amounts of hot or cold water, hot water facilitating solution. These aqueous solutions are acidic to the extent of about 8%, calculated as metaphosphoric acid.

When such a solution is boiled the salt tends to form granular crystals with consequent loss of useful viscosity. This is probably due to depolymerization, for these crystals when fused again yield the glassy Graham's salt. Crystallization such as this is often undesirable when the viscose associations of the salt and water are being used as binders of one kind or another, and it is desirable to employ any means whereby it can be delayed or restrained. I have found that a number of inorganic materials as defined above in the five requirements when added to sodium metaphosphate solutions tend to delay or restrain this crystal formation. Thus, although the pure solution or viscose association when heated in quantities of more than a few cubic centimeters to 110° C. for fifteen or twenty minutes, first clouds, then fills with a mass of crystals, often caking dry, the various mixtures behave differently as illustrated by the following examples. In each case about 10% of substance on a dry weight basis was added.

The results describe the condition of the combination after boiling to practically solid viscosity, and standing for a month in the open.

| Experiment No. | Compatibles | |
|---|---|---|
| | Salt added | Results |
| 1 | Sodium arsenite | Non-crystalline, dried. |
| 2 | Sodium bisulfate | Non-crystalline, soft. |
| 3 | Sodium dichromate | Non-crystalline, dried. |
| 4 | Sodium nitrate | Non-crystalline, dried. |
| 5 | Sodium pyrophosphate | Slightly crystalline, dried. |
| 6 | Sodium tungstate | Non-crystalline, dried. |
| 7 | Ammonium molybdate | Non-crystalline, dried. |
| 8 | Diammonium phosphate | Non-crystalline, dried. |
| 9 | Potassium carbonate | Slightly crystalline, dried. |
| 10 | Lithium metaphosphate (added as lithium carbonate) | Clear, non-crystalline. |

Contrasting with these are the following incompatibles

| | Salt added | Results |
|---|---|---|
| 11 | Sodium nitrite | Crystalline but somewhat soft. |
| 12 | Sodium peroxide | Crystalline but slightly soft. |
| 13 | Potassium cyanide | Decomposes. |
| 14 | Potassium ferricyanide | Decomposes. |

It will be observed that the salts in the first table (experiments 1 to 10) have properties which come within one or more of the five requirements stated above and do not conflict with any, while those of the second table (experiments 11 to 14) do. Thus number 11 decomposes with liberation of an excess of basic radical violating the second requirement. Number 12 is highly alkaline, violating the first requirement. Number 13 was found to decompose yielding residual base and volatile cyanide derivatives. Number 14 likewise decomposed.

Following Requirement 4, the neutralization of the acidity of sodium metaphosphate solutions with carbonates of other alkali metals especially lithium and potassium yield viscous associations containing then three alkali metal metaphosphates that show markedly less tendency to crystallize than do the pure solutions of sodium salt. Thus to 100 parts of sodium metaphosphate in solution were added six parts of potassium carbonate and two parts of lithium carbonate which by reaction formed lithium metaphosphate, and the mixture was boiled until free from carbon dioxide of reaction. The resulting solution could be boiled to a state of high voscosity without development of crystallization.

*Alkali metal monoborate, for example sodium monoborate*

This substance, more accurately called sodium diborate, is an article of commerce and has the formula $NaBO_2$. Commercial samples have been found to vary widely in their tendency to crystallize and, in general, solutions of useful viscosity crystallize far more easily than do those of sodium metaphosphate. With the monoborate, however, the crystallization is not a change in polymerization, but a simple crystal formation due to saturation, and capable of re-solution upon the addition of more water. The other admirable properties of the viscous solution (such as low electrical conductivity in thin films) make the restraint of the tendency to crystallize highly desirable. The potassium, ammonium, or lithium monoborates may also be used.

In the following tables both compatibles and incompatibles are given to illustrate the application of the requirements listed above, about 10% of substance on a dry weight basis was added. It should be borne in mind that the aqueous solution of sodium monoborate is markedly alkaline. The results describe the condition of the combination after one week.

| Experiment No. | Compatibles | |
|---|---|---|
| | Salt added | Results |
| 15 | Sodium arsenite | Clear, non-crystalline. |
| 16 | Sodium silicate | Clear, non-crystalline. |
| 17 | Trisodium phosphate | Clear, non-crystalline. |
| 18 | Potassium carbonate | Slightly cloudy, non-crystalline. |
| 19 | Potassium permanganate | Clear, colored, non-crystalline. |
| 20 | Ammonium odide | Clear, non-crystalline. |

| | Incompatibles | |
|---|---|---|
| | Salt added | Results |
| 21 | Sodium chloride | Crystalline, soft. |
| 22 | Sodium sulfate | Crystalline, hard. |
| 23 | Phosphoric anhydride | Crystalline, hard. |
| 24 | Boric acid | Crystalline, hard. |

Thus numbers 21 and 22 violate Requirement 3. 23 and 24 violate Requirement 1. Experiment 24 further violates Requirement 3 in spite of the possible application of Repuirement 4.

*Beryllium salts*

In general, many beryllium salts form viscous aqueous associations with useful properties. When such aqueous associations are heated above the normal dehydration point they nevertheless retain some water as indicated by the development of intumescence, the latter phenomenon being merely the formation of many small steam bubbles in a fluid whose walls are too viscous to permit either aggregation of bubbles or escape of the vapor except slowly by diffusion.

Since this viscosity of such aqueous association is a commercially useful property it is desirable to enhance it by restraint of any tendency of the salt to crystallize. This is most easily accomplished by addition of a slight excess of base. Thus a solution of beryllium sulfate containing free acid may crystallize on standing, but if slight excess of base, less than three percent, such as beryllium oxide or hydrate, is added, the solution shows no such tendency to crystallize but rather upon loss of water dries out to a horny film although eventually under application of excess of heat reaching the stage of intumescence.

It is thus evident that with viscous aqueous associations of inorganic substances as described herein, a tendency of the substance to crystallize whether through change in molecular structure of saturation of solution can be restrained by the addition of small proportions of other inorganic substances chosen, in general, in accordance with the requirements above.

To use any of the inorganic viscous associations described herein as a plastic for any purpose, the viscous mass is suitably heated to a temperature above that at which it is to be used, and then shaped as desired. For use as a lute the heated mass may be applied with a spatula, trowel, or any other suitable tool, and after cooling the mass will retain its desired shape and seal the joint. The viscous mass is not hydroscopic, nor is it affected by organic solvents.

In the manufacture of built-up mica plates, the viscous association is sufficiently heated and then applied to layers of mica flakes in the same manner as now practiced with shellac solutions. The assembled body of mica flakes and viscous binder is then transferred to the hot press, where it is heated and the binder concentrated, pressed, and cooled.

I claim:—

1. The method of restraining crystal development in, and upon concentration of a dissolved inorganic viscous colloidal aqueous association, which comprises incorporating with said colloidal aqueous association a minor portion of a compatible inorganic compound having the property of cooperating therewith to maintain the resulting mass in the viscous state and free from crystal development through an increasingly elevated temperature range at an increasing concentration.

2. The method of restraining crystal development in, and upon concentration of a dissolved inorganic viscous colloidal aqueous association, which comprises incorporating with said colloidal aqueous association a minor portion of a compatible alkali metal salt having the property of cooperating therewith to maintain the resulting mass in the viscous state and free from crystal development through an increasingly elevated temperature range at an increasing concentration.

3. The method of restraining crystal development in, and upon concentration of a dissolved inorganic viscous colloidal aqueous association, which comprises incorporating with said colloidal aqueous association a minor portion of a compatible inorganic compound whose aqueous solution has the same character of reaction to an indicator as that of the viscous association and also having the property of cooperating therewith to maintain the resulting mass in the viscous state and free from crystal development through an increasingly elevated temperature range at an increasing concentration.

4. The method of restraining crystal development in, and upon concentration of a dissolved inorganic viscous colloidal aqueous association, which comprises incorporating with said colloidal aqueous association a minor portion of a compatible inorganic compound which is free from unfavorable influences upon the phase rule relations of the components of the viscous aqueous association and having the property of cooperating therewith to maintain the resulting mass in the viscous state and free from crystal development through an increasingly elevated temperature range at an increasing concentration.

5. The method of restraining crystal development in, and upon concentration of a dissolved inorganic viscous colloidal aqueous association, which comprises incorporating with said colloidal aqueous association a minor portion of a compatible inorganic compound an acid radical of which is identical with that of a component of the viscous association and having the property of cooperating therewith to maintain the resulting mass in the viscous state and free from crystal development through an increasingly elevated temperature range at an increasing concentration.

6. The method of restraining crystal development in and upon concentration of a viscous colloidal aqueous association of dissolved sodium metaphosphate and water which comprises incorporating with said colloidal viscous association a minor portion of a compatible inorganic compound having the property of cooperating therewith to maintain the resulting mass in the viscous state and free from crystal development through an increasingly elevated temperature range at an increasing concentration.

7. The method of restraining crystal development in and upon concentration of a viscous colloidal aqueous association of dissolved sodium metaphosphate and water which comprises incorporating with said colloidal viscous association a minor portion of a compatible alkali metal salt having the property of cooperating therewith to maintain the resulting mass in the viscous state and free from crystal development through an increasingly elevated temperature range at an increasing concentration.

8. The method of restraining crystal development in and upon concentration of a viscous colloidal aqueous association of dissolved sodium metaphosphate and water which comprises incorporating with said colloidal viscous association a minor portion of a compatible inorganic compound which immediately or upon decomposition reacts acidic in the viscous aqueous association and also having the property of cooperating therewith to maintain the resulting mass in the viscous state and free from crystal development through an increasingly elevated temperature range at an increasing concentration.

9. The method of restraining crystal development in and upon concentration of a viscous colloidal aqueous association of dissolved sodium metaphosphate and water which comprises incorporating with said colloidal viscous association a minor portion of a compatible inorganic compound which is free from unfavorable influences upon the phase rule relations of the components of the viscous aqueous association and having the property of cooperating therewith to maintain the resulting mass in the viscous state and free from crystal development through an increasingly elevated temperature range at an increasing concentration.

10. The method of restraining crystal development in and upon concentration of a viscous colloidal aqueous association of dissolved sodium metaphosphate and water which comprises incorporating with said colloidal viscous association a minor portion of a compatible alkali metal metaphosphate having the property of cooperating therewith to maintain the resulting mass in the viscous state and free from crystal development through an increasingly elevated temperature range at an increasing concentration.

11. The method of restraining crystal development in and upon concentration of a viscous colloidal aqueous association of a dissolved alkali metal monoborate and water which comprises incorporating with said colloidal aqueous association a minor portion of a compatible inorganic compound having the property of cooperating therewith to maintain the resulting mass in the viscous state and free from crystal development through an increasingly elevated temperature range at an increasing concentration.

12. The method of restraining crystal development in and upon concentration of a viscous colloidal aqueous association of a dissolved alkali metal monoborate which comprises incorporating with said colloidal aqueous association a minor portion of a compatible alkali metal salt having the property of cooperating therewith to maintain the resulting mass in the viscous state and free from crystal development through an increasingly elevated temperature range at an increasing concentration.

13. The method of restraining crystal development in and upon concentration of a viscous colloidal aqueous association of a dissolved alkali metal monoborate and water which comprises incorporating with said aqueous association a minor portion of a compatible inorganic compound whose aqueous solution has the same character of reaction to an indicator as that of the viscous association and also having the property of cooperating therewith to maintain the resulting mass in the viscous state and free from crystal development through an increasingly elevated temperature range at an increasing concentration.

14. The method of restraining crystal development in and upon concentration of a viscous colloidal aqueous association of a dissolved alkali metal monoborate and water which comprises incorporating with said viscous association a minor portion of a compatible inorganic compound which immediately or upon decomposition reacts alkaline in the viscous aqueous association and also having the property of cooperating therewith to maintain the resulting mass in the viscous state and free from crystal development through an increasingly elevated temperature range at an increasing concentration.

15. The method of restraining crystal development in and upon concentration of a viscous colloidal aqueous association of a dissolved alkali metal monoborate and water which comprises incorporating with said colloidal aqueous association a minor portion of a compatible inorganic compound which is free from unfavorable influences upon the phase rule relations of the components of the viscous aqueous association and having the property of cooperating therewith to maintain the resulting mass in the viscous state and free from crystal development through an increasingly elevated temperature range at an increasing concentration.

16. The method of restraining crystal development in and upon concentration of a viscous colloidal aqueous association of a dissolved alkali metal monoborate and water which comprises incorporating with said colloidal aqueous association a minor portion of a compatible inorganic compound an acid radical of which is identical with that of a component of the viscous association and having the property of cooperating therewith to maintain the resulting mass in the viscous state and free from crystal development through an increasingly elevated temperature range at an increasing concentration.

17. The method of restraining crystal development in and upon concentration of a viscous colloidal aqueous association of a dissolved alkali metal monoborate and water which comprises incorporating with said colloidal aqueous association a minor portion of a compatible alkali metal containing inorganic compound an acid radical of which is identical with that of a component of the viscous association and having the property of cooperating therewith to maintain the resulting mass in the viscous state and free from crystal development through an increasingly elevated temperature range at an increasing concentration.

18. The method of restraining crystal development in and upon concentration of a viscous colloidal aqueous association of a dissolved beryllium salt and water which comprises incorporating with said colloidal viscous association a minor portion of a compatible inorganic compound which is free from unfavorable influences upon the phase rule relations of the components of the viscous aqueous association and having the property of cooperating therewith to maintain the resulting mass in the viscous state and free from crystal development through an increasingly elevated temperature range at an increasing concentration.

19. The method of restraining crystal development in and upon concentration of a viscous colloidal aqueous association of a dissolved beryllium salt and water which comprises incorporating with said colloidal viscous association a minor excess of a compatible inorganic basic compound having the property of cooperating therewith to maintain the resulting mass in the viscous state and free from crystal development through an increasingly elevated temperature range at an increasing concentration.

20. The method of restraining crystal development in and upon concentration of a viscous colloidal aqueous association of a dissolved beryllium salt and water which comprises incorporating with said colloidal viscous association a minor excess of a compatible basic beryllium compound having the property of cooperating therewith to maintain the resulting mass in the viscous state and free from crystal development through an increasingly elevated temperature range at an increasing concentration.

21. The method of restraining crystal development in and upon concentration of a viscous colloidal aqueous association of a dissolved beryllium salt and water which comprises incorporating with said colloidal viscous association a minor excess of a compatible basic beryllium oxygen compound having the property of cooperating therewith to maintain the resulting mass in the viscous state and free from crystal development through an increasingly elevated temperature range at an increasing concentration.

22. A product comprising a viscous colloidal aqueous association of a dissolved inorganic compound and containing a compatible crystallization restraining inorganic compound in such quantities as to have the property of restraining crystallization in said association through a wide temperature range from a concentrated mass.

23. A product comprising a viscous colloidal aqueous association of dissolved sodium metaphosphate and containing a compatible alkali metal salt in such quantities as to have the property of restraining crystallization in said association through a wide temperature range from a concentrated mass.

24. A product comprising a viscous aqueous association of dissolved sodium monoborate and containing a compatible alkali metal compound in such quantities as to have the property of restraining crystallization in said association through a wide temperature range from a concentrated mass.

25. A product comprising a viscous aqueous association of a dissolved beryllium compound and containing a compatible basic beryllium compound in such quantities as to have the property of restraining crystallization in said association through a wide temperature range from a concentrated mass.

WILLIS A. BOUGHTON.

CERTIFICATE OF CORRECTION.

Patent No. 2,016,274. October 8, 1935.

WILLIS A. BOUGHTON.

It is hereby certified that error appears in the printed specification of the above numbered patent requiring correction as follows: Page 3, first column, line 57, in the boxed table, Experiment No. 20, for "odide" read iodide; and line 71, for "Repuirement" read Requirement; and page 4, second column, lines 46 and 59, claims 13 and 14, respectively, after "said" insert the word colloidal; and that the said Letters Patent should be read with these corrections therein that the same may conform to the record of the case in the Patent Office.

Signed and sealed this 12th day of November, A. D. 1935.

Leslie Frazer

Acting Commissioner of Patents.

(Seal)